Sept. 8, 1964  D. E. KLEIN  3,147,982
FLUID-COOLED ROD-PACKING ASSEMBLY
Filed Feb. 14, 1962  3 Sheets-Sheet 1

INVENTOR.
DONALD E. KLEIN
BY
Robert Henderson
ATTORNEY

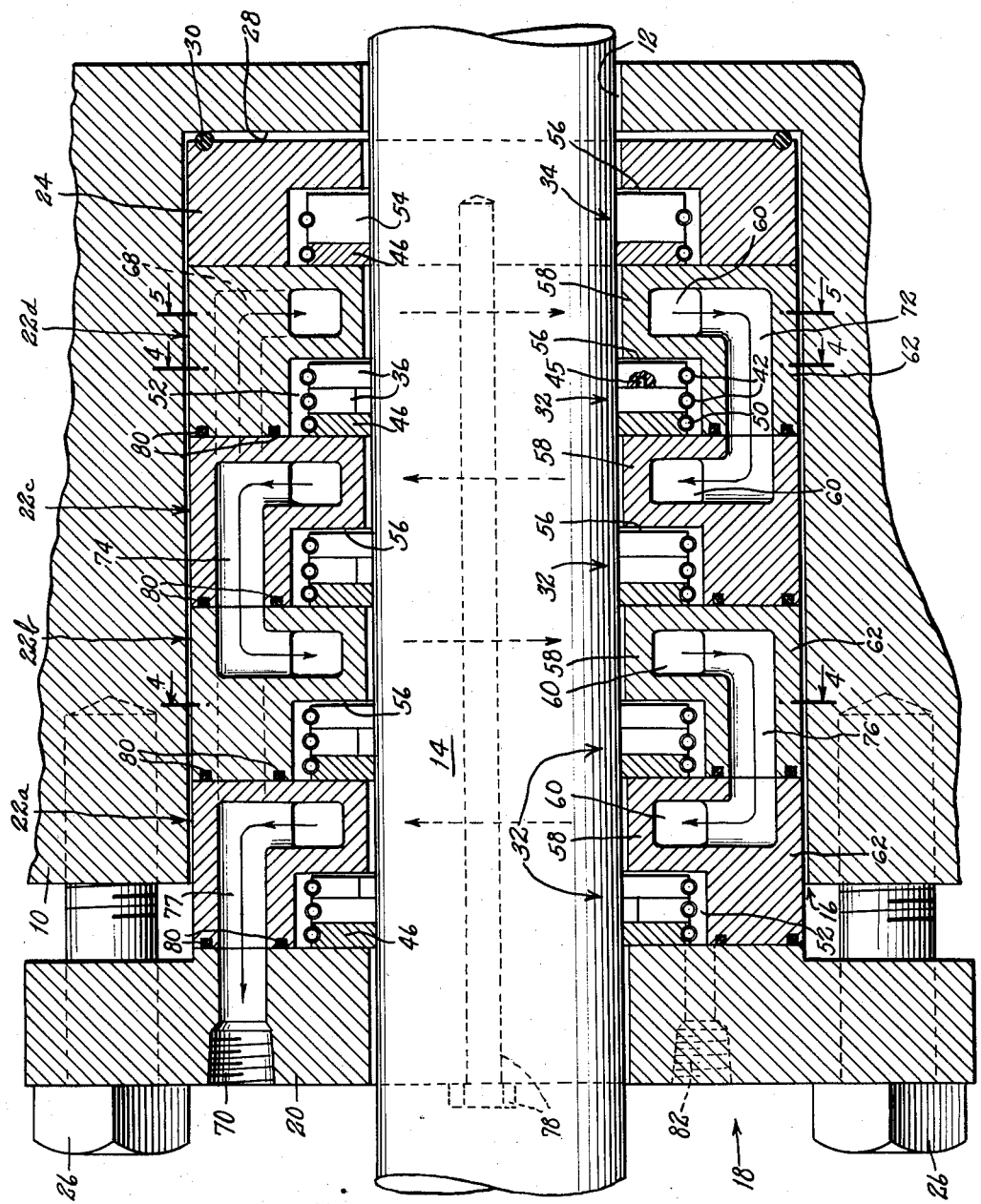

Sept. 8, 1964    D. E. KLEIN    3,147,982
FLUID-COOLED ROD-PACKING ASSEMBLY
Filed Feb. 14, 1962    3 Sheets-Sheet 3

INVENTOR.
DONALD E. KLEIN
BY
Robert Henderson
ATTORNEY

United States Patent Office 3,147,982
Patented Sept. 8, 1964

3,147,982
FLUID-COOLED ROD-PACKING ASSEMBLY
Donald E. Klein, Palmyra, N.Y., assignor to Garlock Inc.,
Palmyra, N.Y., a corporation of New York
Filed Feb. 14, 1962, Ser. No. 173,193
5 Claims. (Cl. 277—16)

This invention relates to rod packings wherein packing rings which effect a sliding seal with a reciprocating rod are contained within surrounding rings which are sealed with respect to a machine casing opening through which the rod extends. More particularly, it relates to improvements in said surrounding rings by means of which the latter may most effectively carry off heat from the packing rings. The heat to be dissipated may come from frictional coaction of said packing rings with the rod and/or from heat of the gas or other fluid which the packing assembly seals within the machine casing.

Thus, an important general object of this invention is the provision of improved means for carrying off heat from said packing rings.

Another important object is the provision of an assembly of such surrounding rings having means by which they may be fluid-cooled in portions in intimate association with related packing rings whereby effectively to carry off heat from the latter.

These objects are accomplished by packing assemblies according to this invention of which one embodiment is shown, for illustrative purposes, in the accompanying drawings without, however, limiting the invention to that embodiment.

In the drawings:

FIG. 2 is an axial sectional view, substantially on the irregular line 2—2 of FIG. 1.

Figure 1:
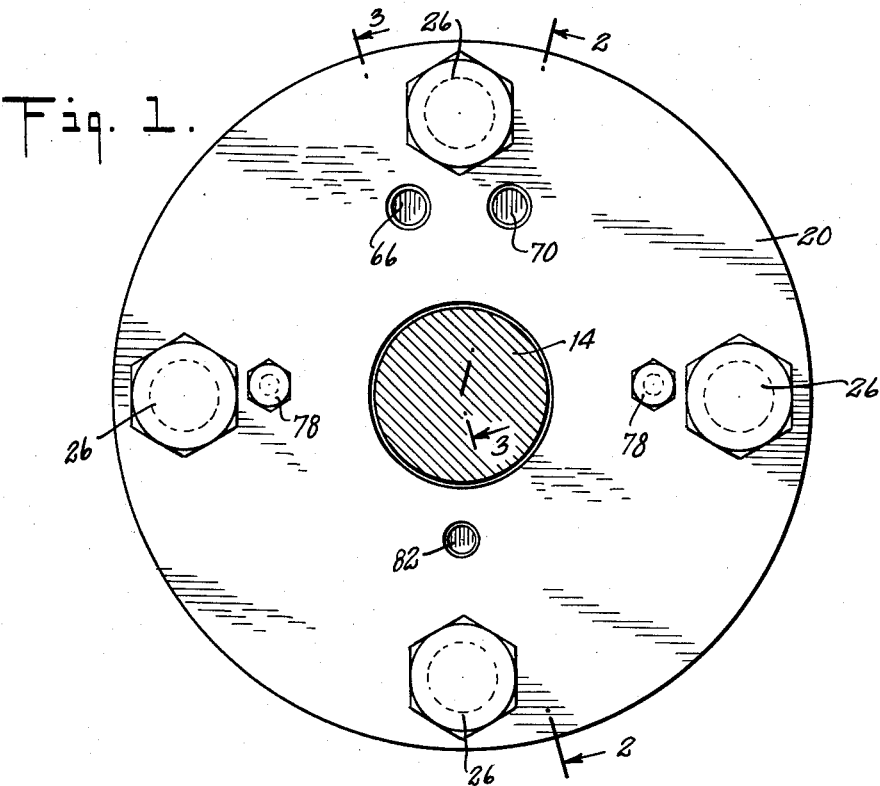
FIGURE 1 is an elevational view of the outer end of a packing assembly according to a preferred embodiment of this invention.

A machine casing wall 10, through an opening 12 of which a rod 14 reciprocates, is formed with a cylindrical, outwardly opening space 16 within which the packing assembly 18 is disposed.

The packing assembly 18 comprises a tandem arrangement of an outer plate 20, four substantially similar cup-shaped packing-holding rings 22a, 22b, 22c, 22d and a somewhat different cup-shaped packing-holding ring 24 at the inner end of the assembly.

Mounting bolts 26, threaded into wall 10, serve, when tightened, to draw the assembly 18 forcibly toward inner, flat wall 28, at the inner end of the space 16, and to hold the several packing-holding rings tightly together; a suitable gasket 30 being provided to effect a seal between ring 24 and wall 28.

The machine casing wall 10 and the plate 20 may be of some metal, such as, e.g. steel, suitable for their purposes and the packing-holding rings 22a, 22b, 22c, 22d and 24 are also of suitable metal, as, e.g. bronze, steel, or cast iron.

Within each of the rings 22a, 22b, 22c and 22d are similar packing ring sets 32 and a similar set may be provided in ring 24, although a somewhat different ring set 34 is shown in ring 24.

Figure 4:
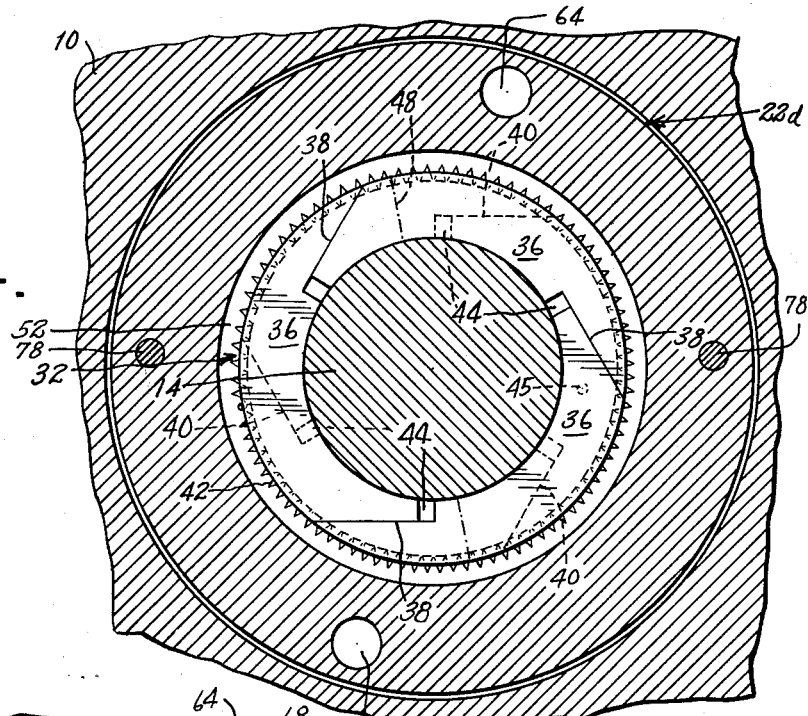
FIG. 4 is a radial sectional view substantially on the line 4—4 of FIG. 2.

Each packing ring set 32 comprises a pair of similar segmental packing rings 36, preferably of polytetrafluoroethylene, the segments of the latter rings being defined by tangential splits, such splits in one of said rings being shown at 38 in full lines in FIG. 4 and in the other of said rings in regularly broken lines at 40. The segments of each ring 36 are held together in ring formation by a surrounding, contractile garter spring 42 which continuously holds the segments intimately upon the rod 14 as complete sealing rings. The splits 38 and 40 are formed with clearances 44 at their inner ends to permit continued sealing intimacy of the segments of the rings 36 with the rod 14 even after appreciable wear within the latter rings. The two rings 36 are held with their splits in non-alignment, as illustrated, by a suitable dowel and recess 45.

Each ring set 32 further includes a split anti-extrusion ring 46 preferably of metal such as, e.g. bronze or other material of sufficient rigidity to serve to prevent extrusion of the adjacent ring 36 outwardly along the shaft as a result of outwardly effective pressure of the fluid sealed within the related machine casing wall 10. As shown in FIG. 4, the ring 46 is split diametrally, as shown in chain lines at 48 in FIG. 4, the two halves being held intimately together by an outer, garter spring 50. The rod opening between the two halves of the ring 46 is preferably made an accurate sliding fit upon the rod 14.

It should be noted that a substantial annular space 52 is present between the peripheries of the ring sets 32, thereby enabling the latter to slide radially within the related packing-holding rings in response to any radial or eccentric shifting of the shaft. This minimizes wear of the rings 36; and, together with the nature of the compositon of anti-extrusion ring 46 and the fact that the latter's garter spring does not contract it tightly upon the rod 14, these conditions substantially eliminate wear of the anti-extrusion ring.

Although the ring set 34 may be the same as set 32, the former is shown as comprising a single polytetrafluoroethylene split packing ring 54 and a diametrally split anti-extrusion ring 46, the same as employed in ring sets 32. The ring 54, as illustrated, is thicker than a single ring 36 and is radially cut into three equal segments.

It should be observed that the ring sets 32 and 34 are slightly smaller or a loose fit axially, within the spaces provided for them; and as the fluid (often under substantial pressure) at the inner side of the machine casing wall exerts an axially outwardly applied force against the axially innermost rings of the sets 32 and 34, all rings of these sets are urged axially outwardly by the pressure of the sealed fluid, leaving spaces 56 at the axially inner ends of said sets. The pressure of the sealed fluid thus passes through spaces 56 into spaces 52 wherein the pressure exerts a radially inward force upon rings 36, 54 thereby augmenting the latter's garter springs in holding the segments of the latter rings firmly against the rod 14.

The heat of sealed fluid within the machine casing wall 10 is often great enough that either alone or together with heat generated frictionally in the ring sets 32, 34, it creates a heat condition which may be detrimental to the packing and it is because of this that the greatly improved cooling characteristics of this invention become important. This invention had its inception in the realization that, as the pressure of sealed fluid holds the several rings of each ring set 32 and 34 intimately together and holds anti-extrusion rings 46 intimately against adjacent bottom or radial flanges 58 of packing-holding rings 22a, 22b, 22c and 22d, there should be some considerable advantage in providing effective cooling for said radial flanges. This led to the provision of means, hereinafter described, for cooling such packing-holding rings and their said radial flanges.

Figure 3:
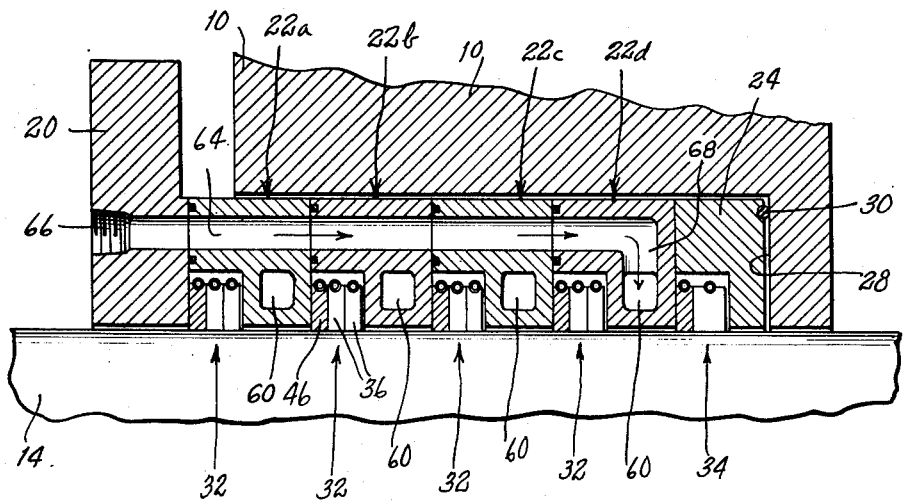
FIG. 3 is a fragmentary axial sectional view, substantially on the line 3—3 of FIG. 1.
Figure 5:
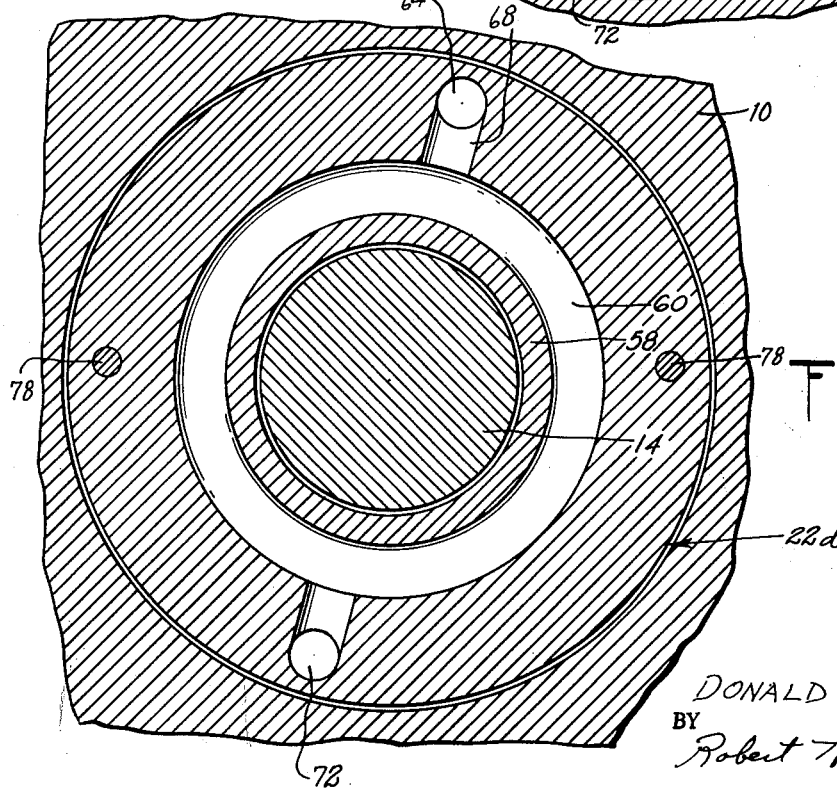
FIG. 5 is a radial sectional view substantially on the line 5—5 of FIG. 2.

According to this invention, in the form illustrated, each of packing-holding rings 22a, 22b, 22c and 22d is formed with a continuous circular duct 60, such as is illustrated in FIG. 5 in ring 22d, and the outer cylindrical portions 62 of said rings, as shown in FIG. 3, are formed with aligned axial passages forming an axially extending duct 64.

Suitable cooling fluid, pumped into an input port 66 in plate 20, passes from said port, through duct 64, into a radial duct 68 in ring 22d, thence into circular duct 60 of the latter ring. The circulating cooling fluid passes from the latter circular duct, through rings 22a, 22b, and 22c, by a circuitous route, to output port 70 in plate 20.

The mentioned circuitous route includes U-shaped ducts 72, 74 and 76 which are formed mostly in axially aligned parts of the outer cylindrical portions 62 of the rings 22a, 22b, 22c and 22d and interconnect the circular ducts 60 of the four latter rings. Ducts 72 and 76 are toward the bottom of the device and are in axial alignment, while duct 74 is toward the top of the device and in axial alignment with the output port 70. An L-shaped, axially extending duct 77 in ring 22a connects the circular duct 60 of that ring with the output port 70. Thus, it will be seen that cooling fluid moves downwardly in ring 22d, upwardly in ring 22c, downwardly in ring 22b, and upwardly in ring 22a; and in thus coursing downwardly and upwardly, the cooling fluid moves in two semi-circular paths in the ducts 60, thereby exerting a cooling effect completely about the radial flanges 58 of the packing-holding rings and, of course, completely about all excepting the outermost one of the anti-extrusion rings 46.

Heat is carried off from the ring 46 of ring set 34 by the radial flange 58 of ring 22d and the cooling fluid coursing through the latter. Under the described arrangement, the cooling fluid, while still relatively cool, is effective at the inner end of the entire packing assembly where, in close proximity to the main body of hot sealed fluid, the cooling effect is most needed. At the outer end of the sealing assembly, however, it suffices for the ring 46 in ring 22a to have its relatively low heat dissipated through the outer plate 20.

For the mentioned duct system to be maintained as described, it is essential that the several rings 22a, 22b, 22c, 22d, and 24 be kept in alignment as shown and described. For this purpose, the device is provided with one or more long screws 78 (two being shown) which extend with a free but close fit through suitable axial bores in plate 20, and rings 22a, 22b, 22c, and 22d, and are threaded into ring 24, these bolts being in circular alignment with the input and output ports 66 and 70 but substantially removed angularly from said ports and from the axially extending ducts 64, 72, 74, 76 and 77.

It will be realized that alignment means other than bolts 78 could be employed. For example, the plate 20 and the several rings to be maintained in proper angular relationship could be so held by a suitable dowel arrangement such as shown at 45.

Ring gaskets 80 of suitable material are provided where indicated to prevent leakage of cooling fluid at the plate 20 and rings 22a, 22b, 22c, and 22d.

A drain port 82 may be provided in the lower part of plate 20, to carry off any leakage of sealed fluid which may possibly find its way into the annular space 52 in the outermost packing-holding ring 22a.

It will be seen that the cooling fluid courses circuitously through all the flanges 58 of the several packing-holding rings 22a, 22b, 22c and 22d, thereby effectively carrying off excess heat from the packing assembly.

Those familiar with rod-packing problems and devices will realize that the concepts disclosed herein may be utilized in other arrangements without, however, departing from this invention as set forth in the following claims.

I claim:

1. A fluid-cooled rod-packing device for effecting a seal between a reciprocating rod and a machine casing portion through which said rod extends, comprising a plurality of coaxial, cup-shaped packing-holding rings each having a cylindrical wall and a bottom wall extending radially inwardly from said cylindrical wall toward said rod, the said rings being in fixed angular relation to each other and in substantially fluid tight, coaxial interengagement at their said cylindrical walls whereby bottom walls of adjacent rings and said cylindrical walls form annular packing areas extending about said rod, and annular packing means in said areas in intimate heat-transfer association with said bottom walls; said rings being formed with continuous circular ducts in said bottom walls in substantial coaxial alignment with said packing means, and separate, axially extending ducts at substantially angularly-removed points in said cylindrical walls and connected to opposite sides of the respective rings and to said circular ducts, said device having separate input and output ports for cooling fluid, said axially extending ducts in adjoining rings being interconnected, and all said ports and ducts being interconnected to provide a fluid passage, common to all said rings, for circulation of cooling fluid uninterruptedly, through said rings serially, and through the circular ducts, in all areas of the latter in each ring, whereby to provide effective heat transfer from the packing means to said bottom walls and to cooling fluid in the latter.

2. A fluid-cooled rod-packing comprising plural, cup-shaped, packing-holding rings each having a cylindrical portion and a flange portion extending radially inwardly from said cylindrical portion, said rings being in coaxial, intimately engaging relationship with said flange portions of the rings spaced apart to provide annular packing spaces therebetween, holding means for holding said rings tightly together in said relationship and against relative angular movement, and annular packing means in each of said spaces in intimate association with a flange portion of one of the rings providing the space in which said packing means is disposed; said rings being formed with a continuous, cooling-fluid duct extending through the cylindrical and flange portions of all said plural rings, serially with respect to said rings.

3. A fluid-cooled rod-packing according to claim 2, said duct, in said flange of each ring, being in the form of a complete circle and being in communication with parts of the duct located in said cylindrical portion of the ring at substantially opposite points diagonally in said cylindrical portion.

4. A fluid-cooled rod-packing according to claim 2, said cylindrical portions of all said rings being formed with axially aligned, axially extending parts of said duct constituting a first portion of said duct providing direct fluid communication between the exterior of one end of said packing and one of said rings at the opposite end of said packing, each of said flanges being formed with a completely circular portion of said duct therein, and adjoining ones of said rings being formed with inter-communicating L-shaped passages within the cylindrical portions of said adjoining rings providing interconnections between the circular duct portions of said adjoining rings; said interconnections between alternate couples of adjoining rings being substantially opposite to each other diagonally, to constrain fluid to circulate fully through said circular duct portions, said first portion of the duct communicating with the circular duct portion in the flange of the said ring at said opposite end of the packing, and the circular duct portion of the ring at said one end of the packing being in fluid communication with the exterior of said one end of the packing.

5. A fluid-cooled rod-packing comprising plural packing-holding rings in substantially fluid-tight, coaxial interengagement, each of said rings having a cylindrical portion and a flange portion extending radially inwardly from said cylindrical portion, annular packing means in each of said rings in the angle between said portions and in intimate association with said flange portions, and means for maintaining said rings in such interengagement and in fixed angular relation to each other; each of said rings being formed with a completely circular duct in its said flange portion substantially in axial alignment with said packing means, a first axially extending duct in its said cylindrical portion affording fluid communication between one side of the ring and said circular duct at a first circumferential point of the latter, and a second axially extending duct in its said cylindrical portion affording fluid communication between the other side of the ring and said circular duct at a circumferential point of the latter substantially opposite diagonally from said first circumferential point; and said first and second ducts of successive rings being in fluid communication with each other to provide for circulation of cooling fluid serially through the plural rings.

References Cited in the file of this patent
UNITED STATES PATENTS

| | | |
|---|---|---|
| 1,494,004 | Mallory | May 13, 1924 |
| 2,554,234 | Baudrey et al. | May 22, 1951 |

OTHER REFERENCES

Germany, B 32,275, Feb. 16, 1956.